US009551405B1

United States Patent
Chen (10) Patent No.: US 9,551,405 B1
(45) Date of Patent: Jan. 24, 2017

(54) LENGTH ADJUSTING DEVICE (71) Applicant: Tung-Cheng Chen, Taichung (TW)

(72) Inventor: Tung-Cheng Chen, Taichung (TW)

( * ) Notice: Subject to any disclaimer, the term of this patent is extended or adjusted under 35 U.S.C. 154(b) by 0 days.

(21) Appl. No.: 14/937,278

(22) Filed: Nov. 10, 2015

(51) Int. Cl.
*A44B 11/25* (2006.01)
*F16H 19/04* (2006.01)
*A44B 11/00* (2006.01)
*A41D 13/05* (2006.01)
*F16H 21/44* (2006.01)
*F16H 37/12* (2006.01)

(52) U.S. Cl.
CPC .......... *F16H 19/04* (2013.01); *A41D 13/0556* (2013.01); *A44B 11/008* (2013.01); *A44B 11/25* (2013.01); *F16H 21/44* (2013.01); *F16H 37/12* (2013.01); *F16H 2019/046* (2013.01)

(58) Field of Classification Search
CPC .......... F16H 19/04; F16H 37/12; F16H 21/44; F16H 2019/046; A44B 11/008; A44B 11/25; A41D 13/0556; A42B 3/145; Y10T 24/2187; Y10T 24/2164; Y10T 24/21
USPC ..................................... 24/71 ST, 71.1, 68 B
See application file for complete search history.

(56) References Cited

U.S. PATENT DOCUMENTS

| | | | | |
|---|---|---|---|---|
| 1,817,475 A * | 8/1931 | Becker | ..................... | A44C 5/22 224/176 |
| 2,205,742 A * | 6/1940 | Bowers | ................... | A42B 3/145 2/418 |
| 2,511,234 A * | 6/1950 | Anderson | ............... | A42B 3/145 2/8.1 |
| 2,550,575 A * | 4/1951 | Malcom | ................... | A42B 3/145 2/8.1 |
| 3,047,876 A * | 8/1962 | Malcom, Jr. | ........... | A42B 3/145 2/9 |
| 3,090,046 A * | 5/1963 | Bowers, Sr. | ........... | A42B 3/145 2/8.1 |
| 3,214,768 A * | 11/1965 | Bohner | .................. | A42B 3/225 2/10 |
| 3,214,809 A * | 11/1965 | Zahnor | .................... | A61F 9/06 2/418 |
| 3,325,824 A * | 6/1967 | Donegan | .................. | A61F 9/06 2/8.1 |
| 3,444,560 A * | 5/1969 | Northup, Jr. | ........... | A42B 3/145 2/8.1 |
| 4,888,831 A * | 12/1989 | Oleson | .................. | A42B 3/145 2/420 |
| 5,357,654 A * | 10/1994 | Hsing-Chi | ............. | A42B 3/145 2/418 |

(Continued)

*Primary Examiner* — Robert J Sandy
*Assistant Examiner* — Rowland Do
(74) *Attorney, Agent, or Firm* — Rabin & Berdo, P.C.

(57) ABSTRACT

A length adjusting device has a guiding track and a controlling assembly. The guiding track has a guiding structure and a locking structure. The controlling assembly has a connecting base, an engaging body, a switch base, a spring, a switch, and a controlling body. The guiding track is mounted between the connecting base and the engaging body. The engaging body is selectively engaged with the guiding track. The switch is combined with the connecting base and has a switching recess. The spring is mounted between and compressed by the engaging body and the switch base. The switch is selectively engaged in the switching recess. The controlling body is mounted on the switch base and has a gear engaged with the guiding track.

10 Claims, 9 Drawing Sheets

(56) References Cited

U.S. PATENT DOCUMENTS

| | | | | |
|---|---|---|---|---|
| 6,314,588 B1* | 11/2001 | Fang | A42B 3/145 | 2/183 |
| 6,708,376 B1* | 3/2004 | Landry | A42B 3/145 | 2/418 |
| 7,000,262 B2* | 2/2006 | Bielefeld | A42B 3/145 | 2/418 |
| 7,089,603 B2* | 8/2006 | Ketterer | A42B 3/145 | 2/418 |
| 7,174,575 B1* | 2/2007 | Scherer | A42B 3/145 | 2/418 |
| 7,565,704 B2* | 7/2009 | Wu | A42B 3/145 | 2/410 |
| 8,037,548 B2* | 10/2011 | Alexander | A42B 3/127 | 2/417 |
| 8,161,576 B2* | 4/2012 | Lemke | A42B 3/145 | 2/417 |
| 8,336,114 B1* | 12/2012 | Lee | A42B 3/145 | 2/9 |
| 8,359,672 B2* | 1/2013 | Moelker | A42B 3/145 | 2/181 |
| 8,370,967 B2* | 2/2013 | Chen | A42B 3/145 | 2/414 |
| 8,832,869 B2* | 9/2014 | Ma | A42B 3/145 | 2/418 |
| 8,875,318 B2* | 11/2014 | Huh | A42B 3/145 | 2/416 |
| 9,021,616 B2* | 5/2015 | Baty | A42B 3/14 | 2/416 |
| 9,049,896 B2* | 6/2015 | Huh | A42B 3/0406 | |
| 2002/0178548 A1* | 12/2002 | Freed | A43C 11/08 | 24/19 |
| 2005/0071909 A1* | 4/2005 | Diaz | A41D 13/11 | 2/171.3 |
| 2005/0262619 A1* | 12/2005 | Musal | A42B 3/08 | 2/421 |
| 2006/0048285 A1* | 3/2006 | Bielefeld | A42B 3/145 | 2/416 |
| 2008/0109947 A1* | 5/2008 | Dubois | A42B 3/145 | 2/414 |
| 2011/0099690 A1* | 5/2011 | Higgins | A42B 1/22 | 2/171 |
| 2011/0283440 A1* | 11/2011 | Higgins | A42C 1/00 | 2/195.2 |
| 2015/0059065 A1* | 3/2015 | Klotz | A42B 3/145 | 2/418 |
| 2015/0074876 A1* | 3/2015 | Chiang | A42B 3/145 | 2/418 |
| 2015/0107006 A1* | 4/2015 | Chen | A42B 3/145 | 2/418 |

* cited by examiner

LENGTH ADJUSTING DEVICE

BACKGROUND OF THE INVENTION

1. Field of the Invention

The present invention relates to a length adjusting device, and more particularly to a length adjusting device for a protective gear.

2. Description of Related Art

A protective gear is worn to protect the joint of the user. When the protective gear is worn, two belts are connected with the protective gear, and the lengths of the protective gear and the belts are adjusted by adjusting positions of hook and loop fasteners of the belts.

When the length is adjusted, the hook and loop fasteners have to be detached from each other and then to be attached with each other again. The length cannot be slightly adjusted, and only can be adjusted according to personal experience of the user.

SUMMARY OF THE INVENTION

The main objective of the present invention is to provide an improved length adjusting device for a protective gear to resolve the afore-mentioned problems.

The length adjusting device comprises a guiding track and a controlling assembly.

The guiding track comprises a guiding structure and a locking structure. The guiding structure is disposed on the guiding track and comprises multiple teeth. The locking structure is disposed on the guiding track and comprises multiple engagement notches disposed along a longitudinal direction of the guiding track.

The controlling assembly is selectively and moveably mounted on the guiding track and comprises a connecting base, an engaging body, a switch base, a spring, a switch, and a controlling body. The guiding track is mounted between the connecting base and the engaging body. The engaging body comprises an engaging block formed on the engaging body and selectively engaged with one of the engagement notches. The switch base is combined with the connecting base, is engaged with the connecting base, and comprises an accommodating hole, a restricting flange, and a switching recess. The accommodating hole is formed through the switch base. The restricting flange is formed on the switch base, and is disposed around the accommodating hole. The switching recess is formed in the restricting flange. The spring is mounted between and compressed by the engaging body and the switch base. The switch is mounted on the switch base, is inserted through the accommodating hole, is engaged with the engaging body, and comprises a switching block selectively engaged in the switching recess. The controlling body is mounted on the engaging body and the switch base, is engaged with the connecting base, and comprises a rotatable knob mounted on the switch base and a gear formed on the rotatable knob. The gear is inserted into the engaging body, the switch base and the guiding structure, and is engaged with part of the teeth.

Other objectives, advantages and novel features of the present invention will become more apparent from the following detailed description when taken in conjunction with the accompanying drawings.

DETAILED DESCRIPTION OF PREFERRED EMBODIMENT

Figure 1:
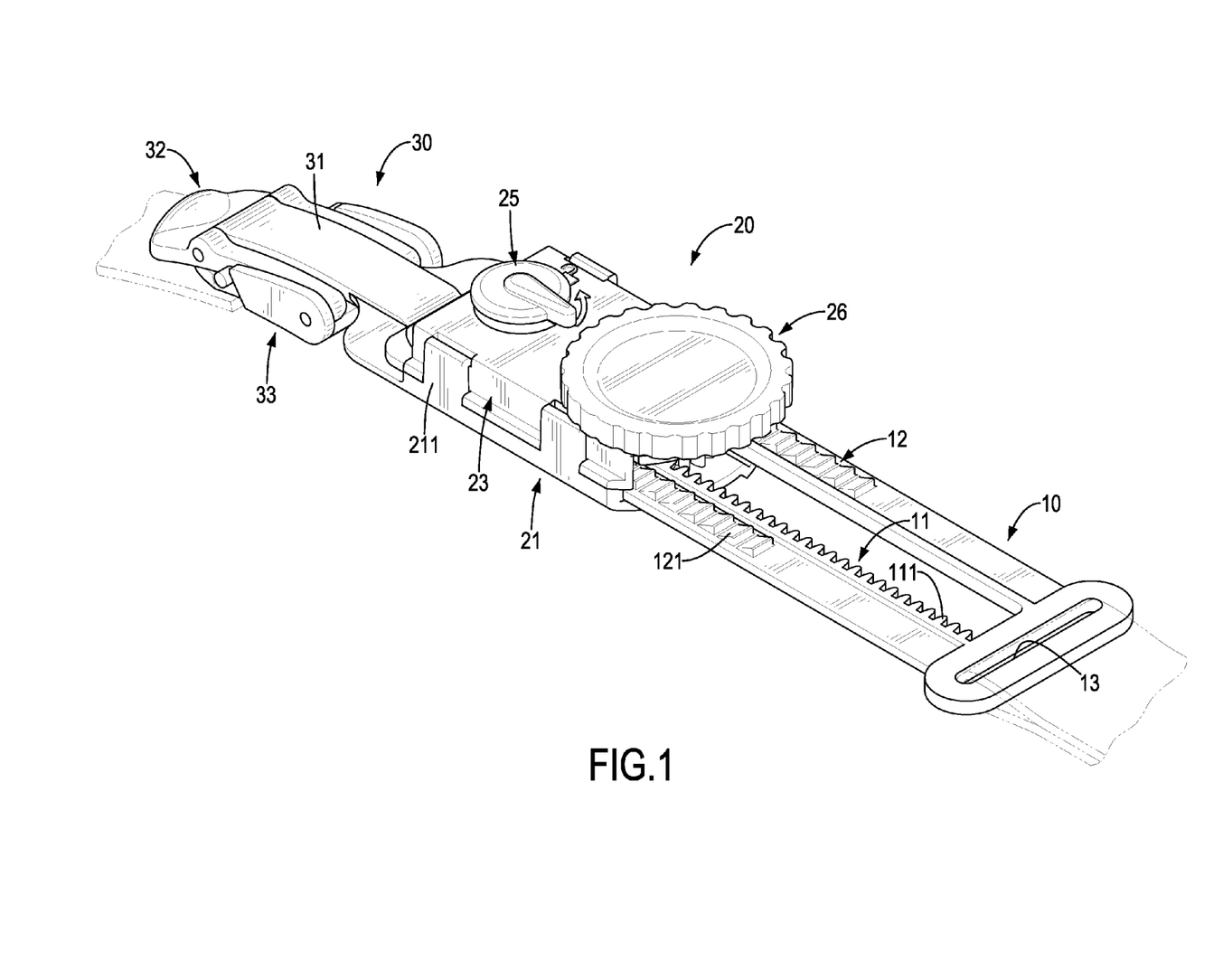
FIG. 1 is a perspective view of a preferred embodiment of a length adjusting device in accordance with the present invention.
Figure 2:
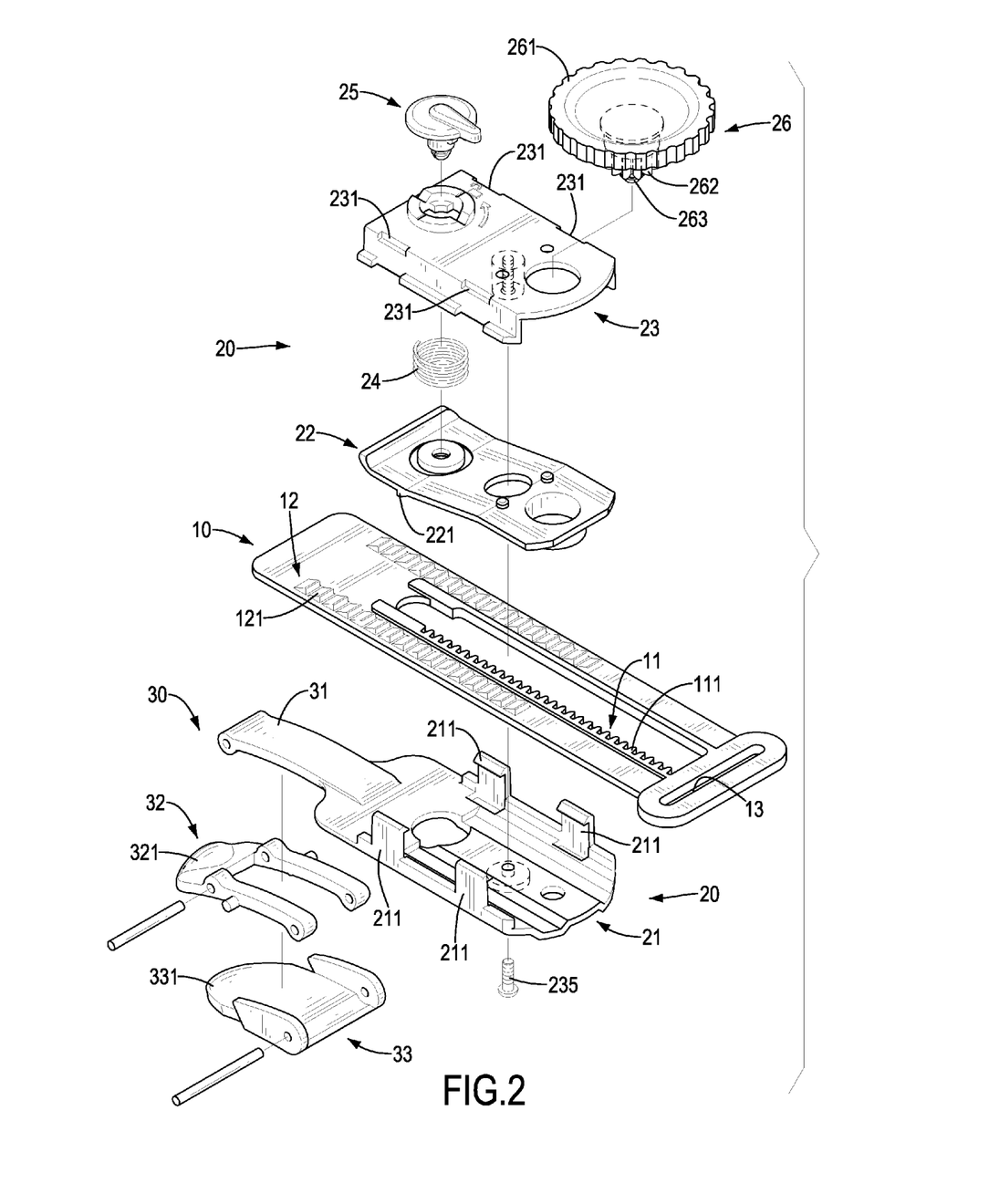
FIG. 2 is an exploded perspective view of the length adjusting device in FIG. 1.
Figure 3:
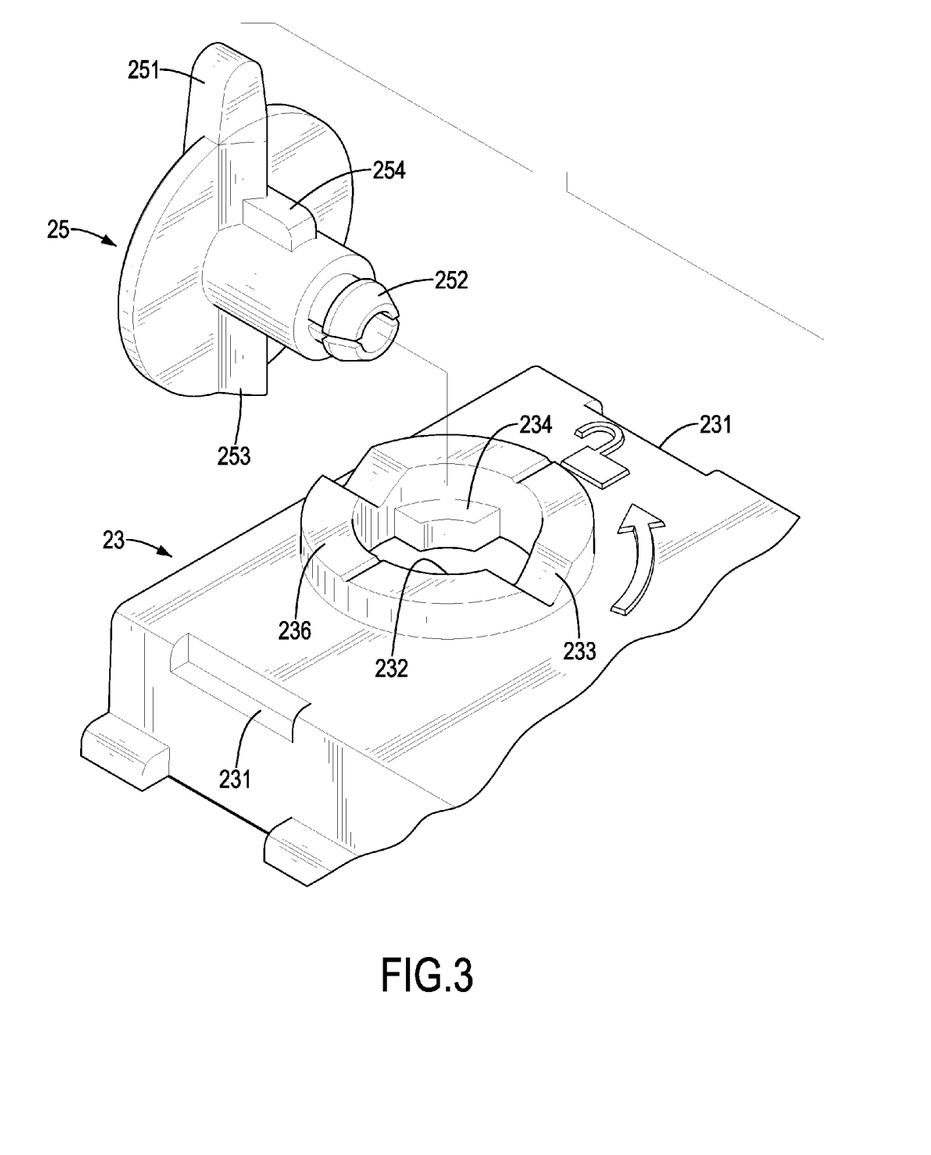
FIG. 3 is an enlarged exploded perspective view of the length adjusting device in FIG. 1.

With reference to FIGS. 1 to 3, a preferred embodiment of a length adjusting device for a protective gear in accordance with the present invention comprises a guiding track 10, a controlling assembly 20, and an extending assembly 30.

The guiding track 10 comprises a guiding structure 11, a locking structure 12, and a connecting portion 13. The guiding structure 11 is disposed on the guiding track 10. Preferably, the guiding structure 11 is formed as a slit and is formed through the guiding track 10. The guiding structure 11 comprises multiple teeth 111. The locking structure 12 is disposed on the guiding track 10 and comprises multiple engagement notches 121 disposed along a longitudinal direction of the guiding track 10. The connecting portion 13 is disposed on an end of the guiding track 10. In use, the connecting portion 13 is applied for connecting with a belt.

Figure 4:
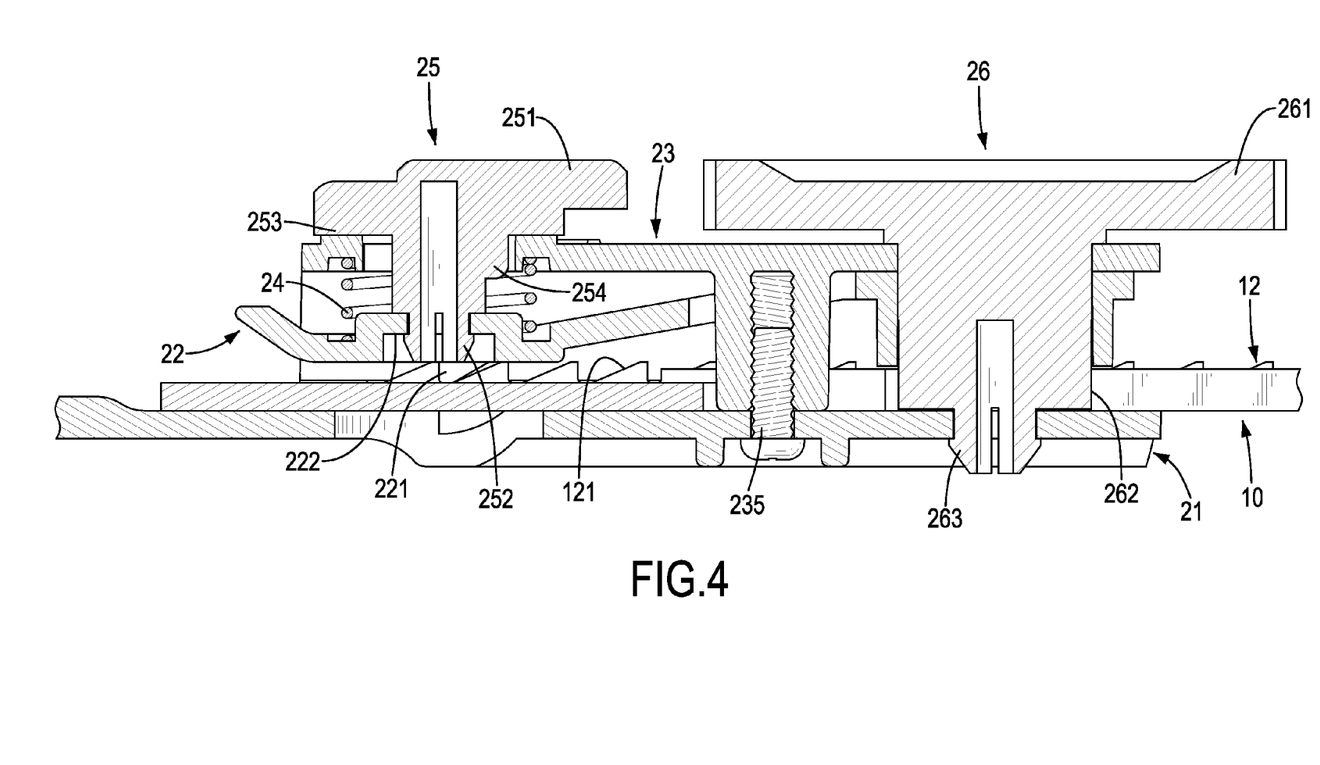
FIG. 4 is an enlarged side view in partial section of the length adjusting device in FIG. 1.

With reference to FIGS. 2 to 4, the controlling assembly 20 is selectively and moveably mounted on the guiding track 10 and comprises a connecting base 21, an engaging body 22, a switch base 23, a spring 24, a switch 25, and a controlling body 26. The connecting base 21 is mounted below the guiding track 10, and comprises multiple hooks 211 formed on the connecting base 21. The engaging body 22 is mounted on the guiding track 10, such that the guiding track 10 is mounted between the engaging body 22 and the connecting base 21. The engaging body 22 comprises an engaging block 221 and an engagement portion 222. The engaging block 221 is formed on the engaging body 22 and is selectively engaged with one of the engagement notches 121. The engagement portion 222 is formed on the engaging body 22.

The switch base 23 is combined with the connecting base 21, and comprises multiple recesses 231, an accommodating hole 232, a restricting flange 236, a switching recess 233, and a restricting block 234. The recesses 231 are formed in the switch base 23, and are respectively engaged with the hooks 211, such that the switch base 23 can be combined with the connecting base 21. Preferably, the switch base 23 is combined with the connecting base 21 by a bolt 235 to prevent the switch base 23 from being detached from the connecting base 21 inadvertently. The bolt 235 is inserted through and limited by the connecting base 21, and is screwed with the switch base 23. The accommodating hole 232 is formed through the switch base 23. The restricting flange 236 is formed on the switch base 23, and is disposed around the accommodating hole 232. The switching recess 233 is formed in the restricting flange 236. The restricting block 234 is formed on and protrudes from the inner surface of the accommodating hole 232.

The spring 24 is mounted between and compressed by the engaging body 22 and the switch base 23. The switch 25 is mounted on the switch base 23, is connected with the engaging body 22, and comprises an indicating portion 251, an engaging end 252, a switching block 253, and a restricted block 254. The indicating portion 251 is mounted on the switch base 23 and is applied for indicating a locked situation or an unlocked situation. The engaging end 252 is formed on the indicating portion 251, is inserted through the accommodating hole 232, and is engaged with the engagement portion 222, such that the switch 25 is connected with the switch base 23. The spring 24 is mounted around the engaging end 252. The switching block 253 is formed on the indicating portion 251 and is selectively engaged in the switching recess 233. The restricted block 254 is formed on the indicating portion 251 and is limited by the restricting block 234.

The controlling body 26 is mounted on the engaging body 22 and the switch base 23, is engaged with the connecting base 21, and comprises a rotatable knob 261, a gear 262, and an engaging part 263. The rotatable knob 261 is mounted on the switch base 23, and is applied for being rotated. The gear 262 is formed on the rotatable knob 261, is inserted into the engaging body 22, the switch base 23, and the guiding structure 11, and is engaged with part of the teeth 111. The engaging part 263 is formed on the gear 262, and is engaged with the connecting base 21, such that the controlling body 26 is connected with the connecting base 21 to prevent the controlling body 26 from being detached from the connecting base 21 inadvertently. When the controlling body 26 is rotated, the gear 262 can be rotated and moved along the guiding structure 11 with the engagement between the gear 262 and the teeth 111, such that the controlling assembly 20 can be moved relative to the guiding track 10.

Figure 5:
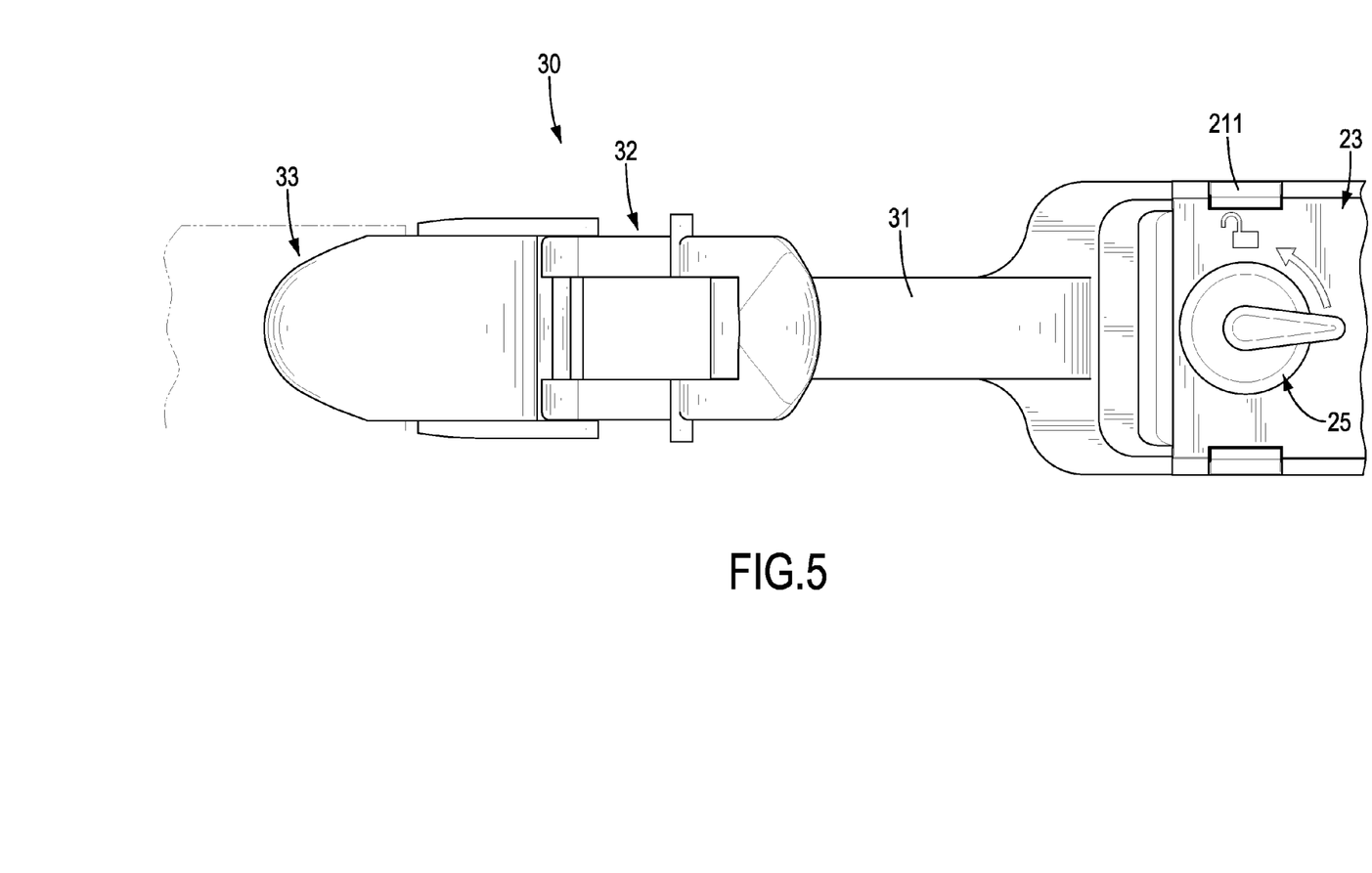
FIG. 5 is an enlarged top view of the extending assembly of the length adjusting device in FIG. 1.
Figure 6:
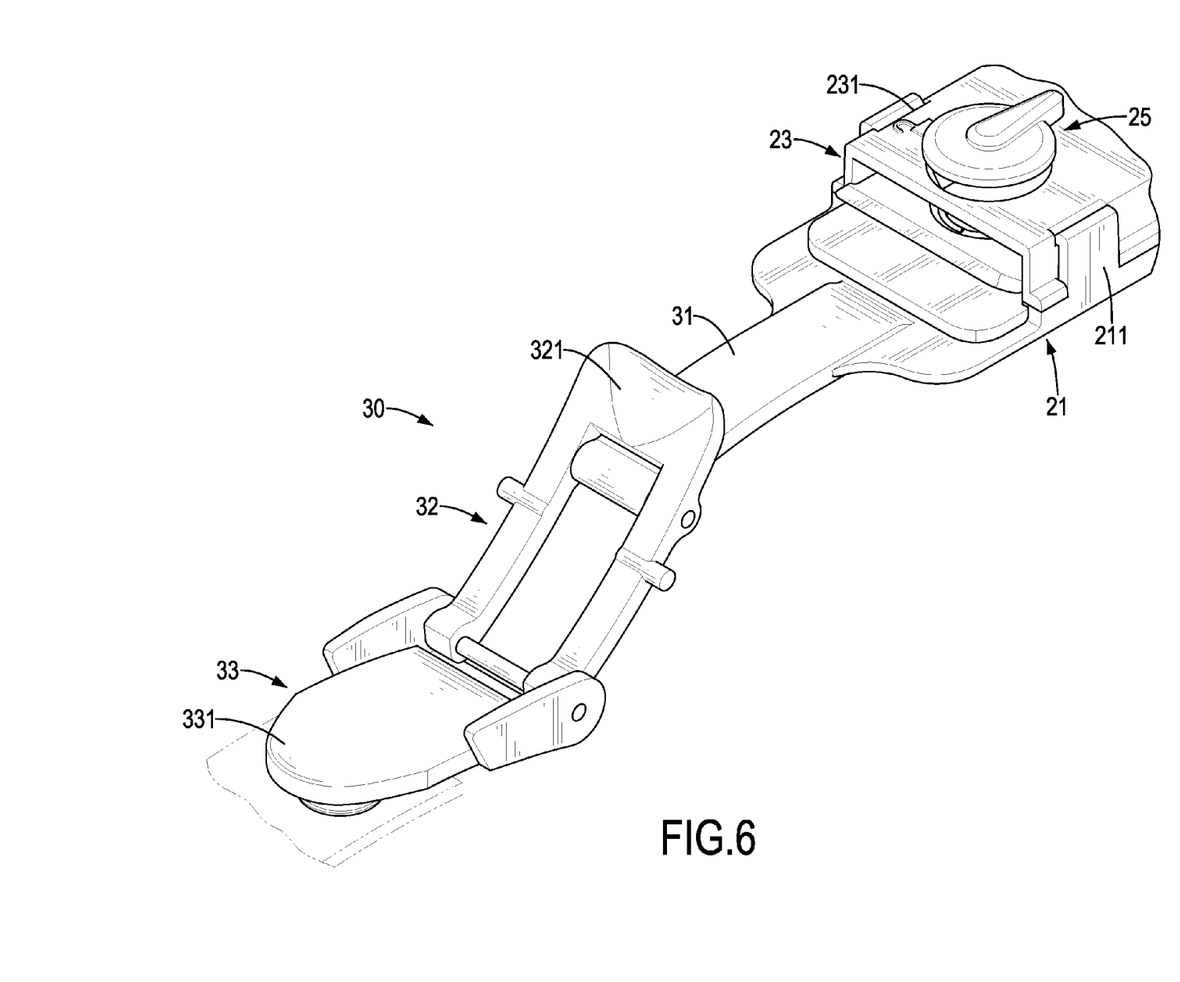
FIG. 6 is an enlarged perspective view of the extending assembly of the length adjusting device in FIG. 1.

With reference to FIGS. 1, 5 and 6, the extending assembly 30 is connected with the connecting base 21 and is located at a position on the connecting base 21 opposite the connecting portion 13. In use, the extending assembly 30 is applied for connecting with a belt. The extending assembly 30 comprises a first lever 31, a second lever 32, and a third lever 33. The first lever 31 is connected with the connecting base 21 at the position opposite the connecting portion 13. The second lever 32 is pivotally connected with the first lever 31 opposite the connecting base 21, and comprises a fixing portion 321 formed on the second lever 32 adjacent to the first lever 31. The third lever 33 is pivotally connected with the second lever 32 opposite the first lever 31, and comprises a fixed portion 331 formed on the third lever 33 and engaged with the fixing portion 321. Preferably, the fixing portion 321 is formed as a curved surface on a bottom of the second lever 32, and the fixed portion 331 is formed as a side surface of the third lever 33.

In use, two belts are respectively connected with the extending assembly 30 and the connecting portion 13 to connect with a protective gear. The spring 24 is compressed by the engaging body 22 and the switch base 23, such that when the switching block 253 is engaged in the switching recess 233, the engagement portion 222 will be driven by the spring 24 to move downward and toward the guiding track 10, and the switch 25 will be driven by the engagement portion 222 to move downward.

Figure 7:
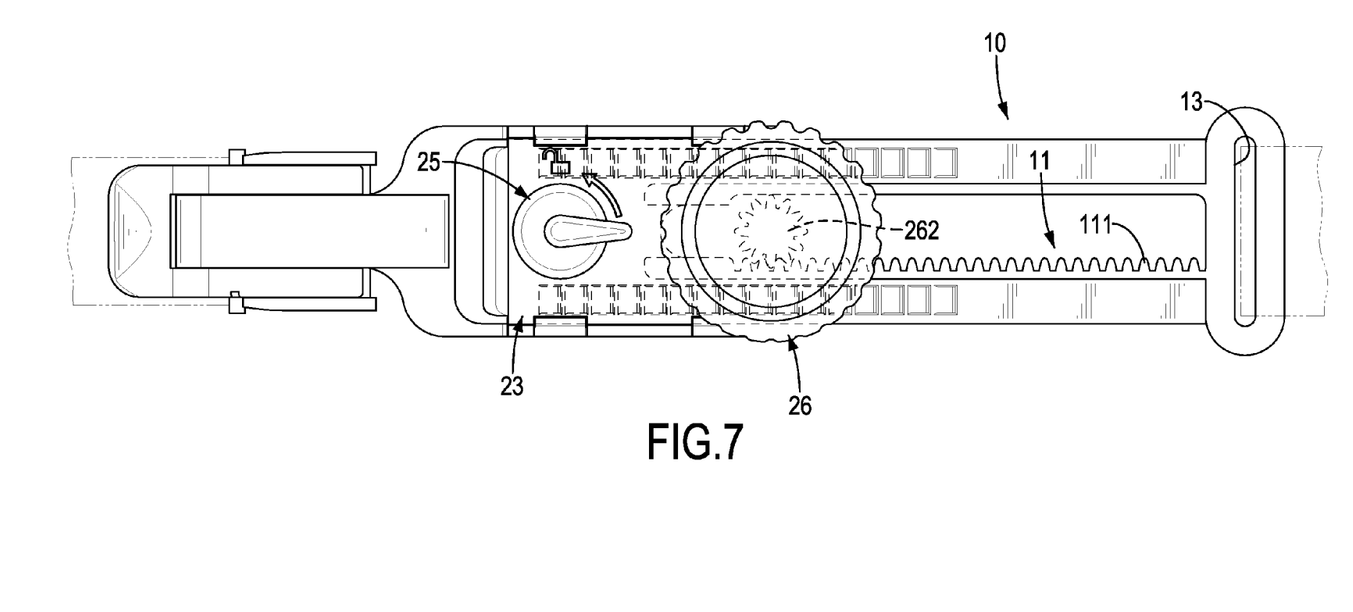
FIGS. 7 and 8 are operational top views of the length adjusting device in FIG. 1.

With reference to FIGS. 4 and 7, when the switching block 253 is engaged in the switching recess 233, the engaging body 22 can be driven by the spring 24 to move downward, and the engaging block 221 can be engaged with one of the engagement notches 121, such that the controlling assembly 20 can be fixed relative to the guiding track 10. Therefore, the lengths of the belts relative to the protective gear will not be changed.

Figure 8:
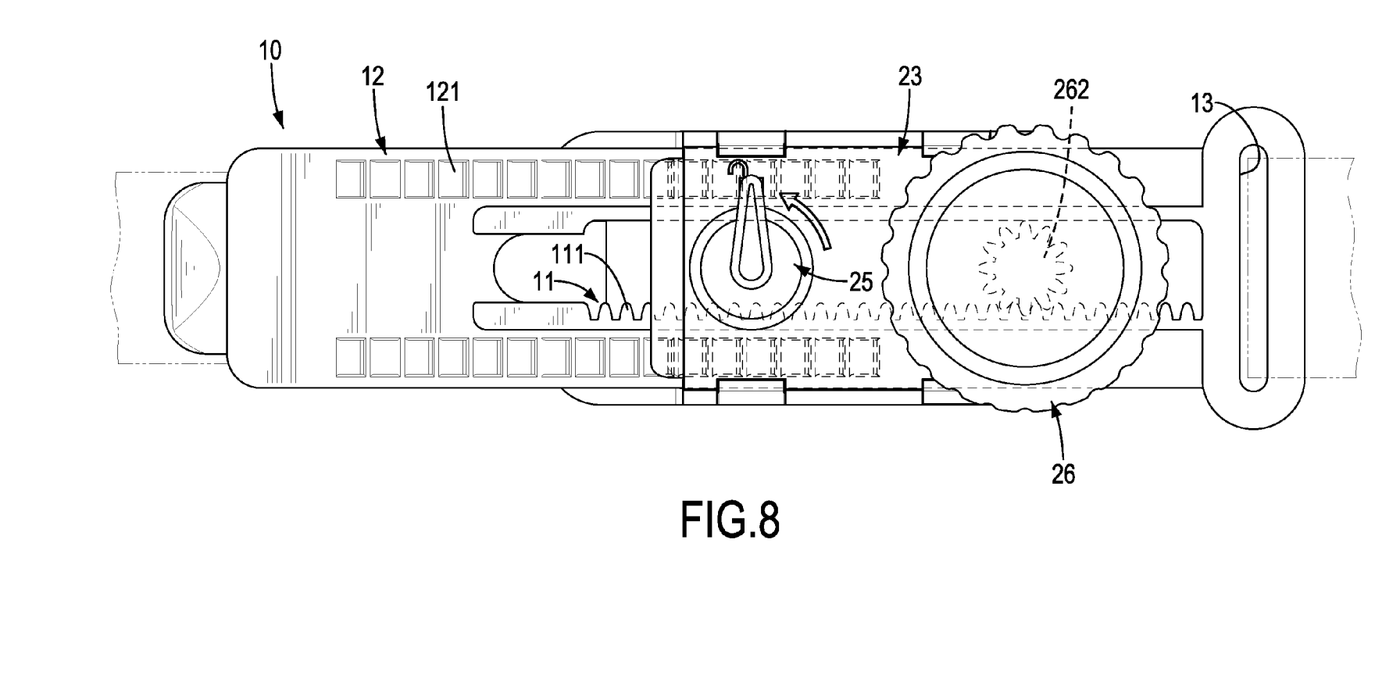
Figure 9:
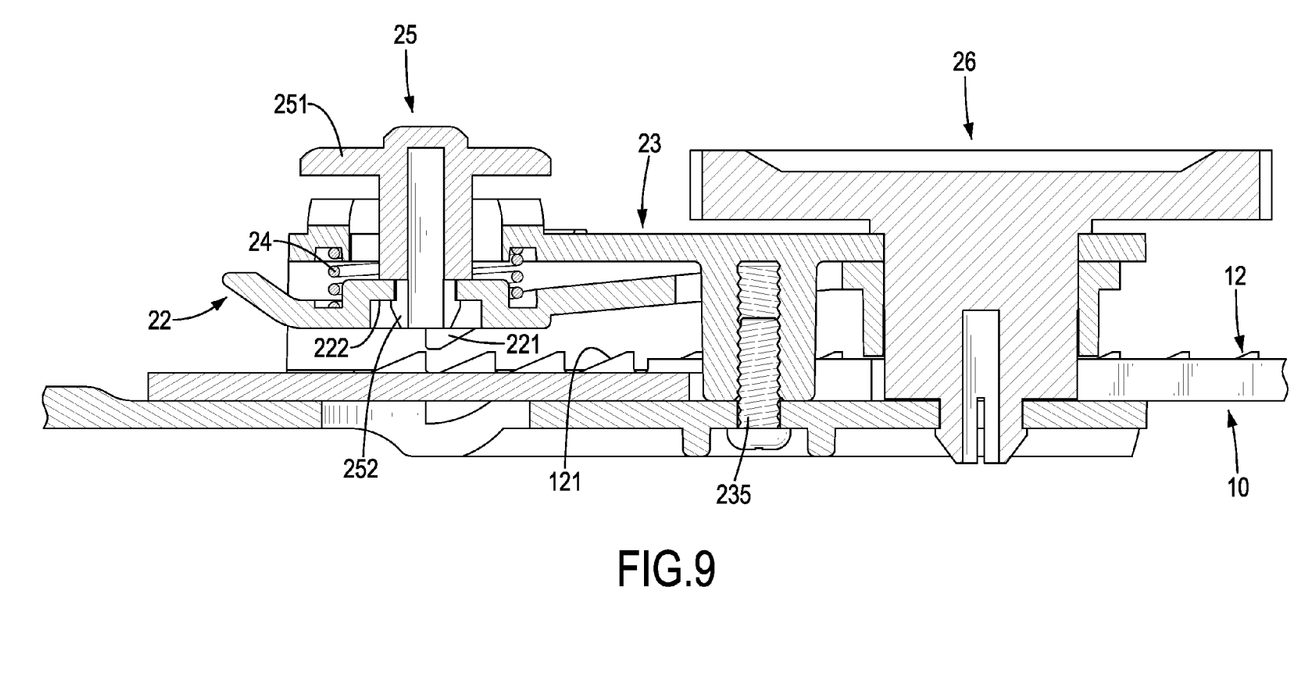
FIG. 9 is an enlarged operational side view in partial section of the length adjusting device in FIG. 1.

With reference to FIGS. 8 and 9, the switch 25 can be rotated by a user, such that the switching block 253 can be detached from the switching recess 233, and the switch 25 will move upward relative to the switch base 23. When the switch 25 moves upward, the engaging body 22 will be driven by the engaging end 252 to move upward, and the spring 24 is further compressed between the engaging body 22 and the switch base 23. When the engaging body 22 moves upward, the engaging block 221 is detached from the engagement notches 121, such that the controlling assembly 20 is moveable relative to the guiding track 10. The user can rotate the controlling body 26, and the gear 262 can be rotated and moved relative to the teeth 111, and the controlling assembly 20 can move relative to the guiding track 10, and the lengths of the belts connected with the length adjusting device can be adjusted relative to the protective gear by the user.

After an adjusting process of the lengths of the belts is finished, the user can rotate the switch 25 again, such that the switching block 253 will be engaged in the switching recess 233 again, and the engaging body 22 can be driven by the spring 24 to move downward to be engaged with one of the engagement notches 121. As a result, the controlling assembly 20 can be fixed relative to the guiding track 10 again.

With reference to FIG. 3, when the user rotates the switch 25, the restricting block 234 and the restricted block 254 can abut each other to restrict a rotation direction of the switch 25. With reference to FIGS. 5 and 6, the fixing portion 321 and the fixed portion 331 can be detached from each other to extend a length of the extending assembly 30, such that the user can further adjust the length of the belts and the length adjusting device relative to the protective gear.

From the above description, it is noted that the present invention has the following advantages: when the engaging block 221 is engaged with one of the engagement notches 121, the controlling assembly 20 is fixed relative to the guiding track 10. When the engaging block 221 is not engaged with the engagement notches 121, the controlling assembly 20 is moveable relative to the guiding track 10, and the user can rotate the controlling body 26 to adjust the position of the controlling assembly 20 relative to the guiding track 10. Therefore, the lengths of the belts can be slightly adjusted by the user, and a wearing process of the protective gear is easy for the user.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A length adjusting device comprising:
   a guiding track comprising
      a guiding structure disposed on the guiding track and comprising multiple teeth; and
      a locking structure disposed on the guiding track and comprising multiple engagement notches disposed along a longitudinal direction of the guiding track;
   a controlling assembly selectively and moveably mounted on the guiding track and comprising
      a connecting base;

an engaging body, and the guiding track mounted between the connecting base and the engaging body, and the engaging body comprising an engaging block formed on the engaging body and selectively engaged with one of the engagement notches;

a switch base combined with the connecting base, engaged with the connecting base, and comprising
an accommodating hole formed through the switch base;
a restricting flange formed on the switch base and disposed around the accommodating hole; and
a switching recess formed in the restricting flange;

a spring mounted between and compressed by the engaging body and the switch base;

a switch mounted on the switch base, inserted through the accommodating hole, and engaged with the engaging body, and the switch comprising a switching block selectively engaged in the switching recess; and a controlling body mounted on the engaging body and the switch base, engaged with the connecting base, and comprising
a rotatable knob mounted on the switch base; and
a gear formed on the rotatable knob, inserted into the engaging body, the switch base, and the guiding structure, and engaged with part of the teeth.

2. The length adjusting device as claimed in claim 1 further comprising an extending assembly connected with an end of the connecting base, and the extending assembly comprising
a first lever connected with the connecting base;
a second lever pivotally connected with the first lever opposite the connecting base, and comprising a fixing portion formed on the second lever; and
a third lever pivotally connected with the second lever opposite the first lever, and comprising a fixed portion formed on the third lever and engaged with the fixing portion.

3. The length adjusting device as claimed in claim 2, wherein
the connecting base comprises multiple hooks formed on the connecting base;
the switch base further comprises recesses formed in the switch base and respectively engaged with the hooks, such that the switch base is combined with the connecting base.

4. The length adjusting device as claimed in claim 2, wherein the switch further comprises
an indicating portion on which the switching block is formed; and
an engaging end formed on the indicating portion, inserted through the accommodating hole, and engaged with the engagement body.

5. The length adjusting device as claimed in claim 4, wherein the spring is mounted around the engaging end of the switch.

6. The length adjusting device as claimed in claim 4, wherein
the switch base further comprises a restricting block formed on the switch base and protruding from the accommodating hole; and
the switch further comprises a restricted block formed on the indicating portion and limited by the restricting block.

7. The length adjusting device as claimed in claim 6, wherein a bolt is inserted through the connecting base and inserted into the switch base, and is combined with the switch base.

8. The length adjusting device as claimed in claim 7, wherein the controlling body further comprises an engaging part formed on the gear and engaged with the connecting base.

9. The length adjusting device as claimed in claim 8, wherein the fixing portion is formed as a curved surface on a bottom of the second lever, and the fixed portion is formed as a side surface of the third lever.

10. The length adjusting device as claimed in claim 1, wherein the switch further comprises
an indicating portion on which the switching block is formed; and
an engaging end formed on the indicating portion, inserted through the accommodating hole, and engaged with the engagement body.

\* \* \* \* \*